United States Patent
Alonso

(10) Patent No.: US 10,807,013 B2
(45) Date of Patent: Oct. 20, 2020

(54) MODIFIED DELTA WING KITE WITH INFLATABLE FUSELAGE

(71) Applicant: Francis A. Alonso, Santa Monica, CA (US)

(72) Inventor: Francis A. Alonso, Santa Monica, CA (US)

( * ) Notice: Subject to any disclaimer, the term of this patent is extended or adjusted under 35 U.S.C. 154(b) by 492 days.

(21) Appl. No.: 15/849,145

(22) Filed: Dec. 20, 2017

(65) Prior Publication Data

US 2019/0184300 A1 Jun. 20, 2019

(51) Int. Cl.
*A63H 27/08* (2020.01)
*B64C 31/06* (2020.01)

(52) U.S. Cl.
CPC .......... *A63H 27/085* (2013.01); *B64C 31/06* (2013.01)

(58) Field of Classification Search
CPC .... A63H 27/085; B64C 31/06; B64C 31/065; B64C 31/032; B64D 17/025
See application file for complete search history.

(56) References Cited

U.S. PATENT DOCUMENTS

| | | |
|---|---|---|
| 1,223,163 A | 4/1917 | Andrew |
| 1,328,143 A | 1/1920 | Fergusson |
| D143,706 S | 2/1946 | Bowers |
| D143,849 S | 2/1946 | Northrop |
| D143,857 S | 2/1946 | Northrop |
| D143,858 S | 2/1946 | Northrop |
| D143,859 S | 2/1946 | Northrop |
| D143,860 S | 2/1946 | Northrop |
| D143,862 S | 2/1946 | Northrop |
| D143,863 S | 2/1946 | Northrop |
| D143,865 S | 2/1946 | Northrop et al. |
| D143,868 S | 2/1946 | Northrop et al. |
| D143,869 S | 2/1946 | Northrop |
| D143,870 S | 2/1946 | Northrop |
| D143,871 S | 2/1946 | Northrop |
| D143,873 S | 2/1946 | Northrop |
| D149,666 S | 5/1946 | Northrop et al. |
| D149,848 S | 6/1948 | Struck |
| D153,590 S | 5/1949 | Eichman |
| 2,533,570 A | 12/1950 | Foy |

(Continued)

FOREIGN PATENT DOCUMENTS

JP     H0531259 A     2/1993

OTHER PUBLICATIONS

Non-Final Office Action for U.S. Appl. No. 29/611,379, filed Jul. 20, 2017 on behalf of Francis A. Alonso, dated Jun. 19, 2018. 17 pgs.

(Continued)

*Primary Examiner* — Philip J Bonzell
*Assistant Examiner* — Michael B. Kreiner
(74) *Attorney, Agent, or Firm* — Steinfl + Bruno LLP

(57) ABSTRACT

Methods and devices taught in the present disclosure address the need for improving stability and performance of delta wing kites. Delta wing kites as disclosed include a delta wing shaped sail reinforced with rigid or semi-rigid wing spars and a center spar, the wing spars and central spar being housed and secured within corresponding sleeves. A combination of various elements such as fuselage and corresponding through-holes, front and back pods, keel and top pockets provides improved stability and performance for the disclosed devices.

29 Claims, 15 Drawing Sheets

(56) References Cited

U.S. PATENT DOCUMENTS

| | | | |
|---|---|---|---|
| D169,962 S | 7/1953 | Burnelli | |
| D170,037 S | 7/1953 | Williams | |
| D170,751 S | 11/1953 | Emery | |
| D171,293 S | 1/1954 | Boyd | |
| D172,465 S | 6/1954 | Del Mar | |
| 2,744,701 A | 5/1956 | Robey | |
| 2,751,172 A * | 6/1956 | Rogallo | A63H 27/08 244/153 R |
| D184,453 S | 2/1959 | Noble | |
| 2,873,077 A | 2/1959 | Corbin | |
| D185,535 S | 6/1959 | Coleman | |
| D188,226 S | 6/1960 | Jones et al. | |
| 2,988,309 A | 6/1961 | Pohl | |
| D194,445 S | 1/1963 | Walker | |
| 3,086,737 A * | 4/1963 | Hyman | A63H 27/085 244/153 R |
| 3,093,354 A * | 6/1963 | Pohl | A63H 27/085 244/154 |
| 3,131,894 A * | 5/1964 | Jalbert | B64D 17/025 244/145 |
| 3,131,895 A * | 5/1964 | Moore | A63H 27/085 244/153 R |
| D198,881 S | 8/1964 | King et al. | |
| D199,510 S | 11/1964 | Burnelli | |
| D200,368 S | 2/1965 | Cohen | |
| 3,310,261 A * | 3/1967 | Rogallo | B64C 31/032 244/219 |
| 3,335,985 A * | 8/1967 | Neal | A63H 27/085 244/153 R |
| 3,369,771 A | 2/1968 | David; Walley Gerald et al. | |
| 3,433,441 A * | 3/1969 | Cummings | B64D 17/025 244/138 R |
| 3,443,779 A * | 5/1969 | Rogallo | B64C 31/036 244/138 R |
| D219,042 S | 10/1970 | King et al. | |
| D220,727 S | 5/1971 | Sawyer | |
| D220,981 S | 6/1971 | Becker et al. | |
| D220,985 S | 6/1971 | Webb | |
| 3,740,008 A | 6/1973 | Grauel | |
| 3,806,071 A * | 4/1974 | Brown | B64C 31/06 244/153 R |
| 3,822,844 A * | 7/1974 | Sutton | B64D 17/025 244/145 |
| 3,893,641 A | 7/1975 | Sutton | |
| D237,291 S | 10/1975 | Meffert | |
| 3,951,363 A | 4/1976 | Grauel | |
| 3,952,975 A * | 4/1976 | Laske | A63H 27/08 244/153 R |
| D240,437 S | 7/1976 | Rizzo | |
| D240,438 S | 7/1976 | Rizzo | |
| D240,439 S | 7/1976 | Rizzo | |
| D240,440 S | 7/1976 | Rizzo | |
| D240,441 S | 7/1976 | Rizzo | |
| D244,265 S | 5/1977 | Opfer | |
| 4,026,504 A * | 5/1977 | Christoffel, Jr. | A63H 27/085 244/155 A |
| 4,029,273 A * | 6/1977 | Christoffel, Jr. | A63H 27/085 244/153 R |
| 4,076,189 A | 2/1978 | Powell | |
| D248,745 S | 8/1978 | Jager | |
| D257,269 S | 10/1980 | Miller et al. | |
| D263,487 S | 3/1982 | Lacrosse et al. | |
| 4,363,458 A * | 12/1982 | Jones | B64D 17/025 244/153 R |
| D270,259 S | 8/1983 | Hermann et al. | |
| D274,827 S | 7/1984 | Belloff | |
| D278,226 S | 4/1985 | Henderson | |
| D278,700 S | 5/1985 | Powers et al. | |
| D279,492 S | 7/1985 | Eddins et al. | |
| D281,338 S | 11/1985 | Gorick et al. | |
| D281,680 S | 12/1985 | Henderson | |
| 4,715,564 A | 12/1987 | Kinn et al. | |
| D294,154 S | 2/1988 | McDaniel | |
| 4,722,498 A * | 2/1988 | Cameron | A63H 27/085 116/210 |
| 4,807,832 A | 2/1989 | Tabor | |
| 4,813,637 A * | 3/1989 | Bondestam | A63H 27/085 244/153 R |
| 4,815,681 A * | 3/1989 | Crowell | A63H 27/08 244/153 R |
| 4,830,313 A | 5/1989 | Cheng | |
| 4,848,704 A | 7/1989 | Sams | |
| D314,366 S | 2/1991 | Waaland et al. | |
| 5,098,039 A | 3/1992 | Linden, Jr. | |
| 5,152,481 A | 10/1992 | Cote et al. | |
| 5,244,169 A * | 9/1993 | Brown | B64D 17/025 244/123.11 |
| D342,717 S | 12/1993 | Mrdeza et al. | |
| D347,032 S | 5/1994 | Nieder | |
| 5,312,069 A | 5/1994 | Bollinger et al. | |
| 5,328,134 A | 6/1994 | Powers | |
| 5,362,017 A * | 11/1994 | Puckett | B64D 17/025 244/145 |
| D362,234 S | 9/1995 | Urie, Jr. | |
| 5,474,257 A * | 12/1995 | Fisher | B64C 31/028 244/49 |
| D372,218 S | 7/1996 | Herzberg et al. | |
| 5,573,207 A * | 11/1996 | Germain | B64D 17/025 244/142 |
| D382,851 S | 8/1997 | Knutson et al. | |
| D392,345 S | 3/1998 | Burghardt | |
| 5,727,756 A | 3/1998 | Rowe | |
| D394,039 S | 5/1998 | Cummings | |
| D396,685 S | 8/1998 | Baumgartner et al. | |
| 5,811,728 A | 9/1998 | Maeda | |
| 5,816,537 A * | 10/1998 | Pascoe | A63H 27/085 244/153 R |
| 5,893,535 A | 4/1999 | Hawley | |
| D410,503 S | 6/1999 | Rosz | |
| D410,504 S | 6/1999 | Tsai | |
| 5,909,858 A | 6/1999 | Hawley | |
| D418,840 S | 1/2000 | Cota et al. | |
| D419,278 S | 1/2000 | Knutson et al. | |
| D428,381 S | 7/2000 | Hartmann et al. | |
| 6,135,388 A | 10/2000 | Hostetter | |
| 6,138,957 A | 10/2000 | Nastasi et al. | |
| D444,512 S | 7/2001 | Miralles et al. | |
| 6,290,178 B1 * | 9/2001 | Wang | A63H 27/08 244/153 R |
| D467,217 S | 12/2002 | Andreyko | |
| D468,255 S | 1/2003 | Gopalaswami et al. | |
| 6,527,224 B2 | 3/2003 | Seidel | |
| D475,340 S | 6/2003 | Arata et al. | |
| D476,943 S | 7/2003 | Reinhard | |
| 6,598,833 B2 * | 7/2003 | Tabor | A63H 27/08 244/153 A |
| D482,079 S | 11/2003 | Solomon, Jr. | |
| D482,409 S | 11/2003 | Tabor | |
| 6,663,050 B2 | 12/2003 | Tabor | |
| D486,775 S | 2/2004 | Reinhard | |
| D488,426 S | 4/2004 | Hall | |
| 6,837,463 B2 * | 1/2005 | Lynn | B64D 17/02 244/146 |
| 6,854,690 B2 | 2/2005 | Tabor | |
| D502,745 S | 3/2005 | Tabor et al. | |
| D503,141 S | 3/2005 | Schafroth | |
| 6,908,360 B1 | 6/2005 | Christensen | |
| D508,013 S | 8/2005 | Rihn et al. | |
| 6,955,325 B1 | 10/2005 | Tabor et al. | |
| D543,494 S | 5/2007 | Hall | |
| D583,295 S | 12/2008 | Au | |
| D588,519 S | 3/2009 | Westra et al. | |
| D588,976 S | 3/2009 | Westra et al. | |
| D597,148 S | 7/2009 | Lin | |
| D597,472 S | 8/2009 | Cazals | |
| 7,621,484 B2 | 11/2009 | Wingert | |
| D607,129 S | 12/2009 | Levine | |
| D610,066 S | 2/2010 | Au | |
| D616,352 S | 5/2010 | Schafroth | |
| D616,804 S | 6/2010 | Manley et al. | |
| D616,805 S | 6/2010 | Zha | |

(56) References Cited

U.S. PATENT DOCUMENTS

| | | |
|---|---|---|
| D626,490 S | 11/2010 | Imel |
| D635,083 S | 3/2011 | DeLaurier |
| D677,613 S | 3/2013 | Luther |
| D690,777 S | 10/2013 | Lukasik |
| D691,215 S | 10/2013 | Madigan |
| D734,402 S | 7/2015 | Reznik |
| D738,438 S | 9/2015 | Cummings |
| 9,580,172 B2 | 2/2017 | Hobart et al. |
| D783,453 S | 4/2017 | Klick |
| 9,625,913 B2 | 4/2017 | Golubev et al. |
| D787,983 S | 5/2017 | Fargeau et al. |
| D803,949 S | 11/2017 | Ferrandino |
| D806,803 S | 1/2018 | Gould et al. |
| D807,809 S | 1/2018 | Suzuki |
| D807,966 S | 1/2018 | Manzoni |
| D810,621 S | 2/2018 | Sadek |
| D813,956 S | 3/2018 | Mcconville et al. |
| 10,040,547 B1 | 8/2018 | Pedigo |
| D843,486 S | 3/2019 | Alonso; Francis A |
| D844,067 S | 3/2019 | Alonso |
| 10,315,764 B2 | 6/2019 | Shannon et al. |
| D873,350 S | 1/2020 | Alonso |
| D874,577 S | 2/2020 | Alonso |
| D874,578 S | 2/2020 | Alonso |
| D875,183 S | 2/2020 | Alonso |
| 2006/0163433 A1* | 7/2006 | Beckingham ........ A63H 27/085 244/153 R |
| 2007/0001057 A1* | 1/2007 | Vincent .................. B64C 31/06 244/153 R |
| 2007/0120017 A1 | 5/2007 | Webb et al. |
| 2007/0295864 A1* | 12/2007 | Garvin ................. A63H 27/085 244/153 R |
| 2008/0035795 A1 | 2/2008 | Hassett et al. |
| 2010/0065676 A1* | 3/2010 | Tong ...................... A63H 27/10 244/2 |
| 2012/0018583 A1 | 1/2012 | Prieto |
| 2016/0347449 A1* | 12/2016 | Huang .................... B64C 31/06 |
| 2018/0134357 A1 | 5/2018 | Vestel et al. |

OTHER PUBLICATIONS

Non-Final Office Action for U.S. Appl. No. 29/611,385, filed Jul. 20, 2017 on behalf of Francis A. Alonso, dated Jun. 19, 2018. 17 pgs.

Notice of Allowance for U.S. Appl. No. 29/611,379, filed Jul. 20, 2017, on behalf of Francis A. Alonso, dated Sep. 10, 2018. 7 pgs.

Notice of Allowance for U.S. Appl. No. 29/611,385, filed Jul. 20, 2017, on behalf of Francis A. Alonso, dated Sep. 10, 2018. 7 pgs.

Corrected Notice of Allowability for U.S. Appl. No. 29/661,028, filed Aug. 23, 2018 on behalf of KD Technologies, Inc., dated Dec. 23, 2019. 7 Pages.

Corrected Notice of Allowability for U.S. Appl. No. 29/661,031, filed Aug. 23, 2018 on behalf of KD Technologies, Inc., dated Dec. 23, 2019. 2 Pages.

Corrected Notice of <span style="font-size: 12px;">Allowabilityfor U.S. Appl. No. 29/661,030, filed Aug. 23, 2018 on behalf of KD Technologies, Inc., dated Dec. 23, 2019. 2 Pages.

Notice of Allowability for U.S. Appl. No. 29/661,026, filed Aug. 23, 2018 on behalf of KD Technologies, Inc., dated Dec. 19, 2019. 2 Pages.

Ex Parte Quayle Office Action for U.S. Appl. No. 29/661,026, filed Aug. 14, 2018 on behalf of KD Technologies, Inc., dated Aug. 14, 2019. 13 Pages.

Ex Parte Quayle Office Action for U.S. Appl. No. 29/661,028, filed Aug. 23, 2018 on behalf of KD Technologies, Inc., dated Aug. 14, 2019. 13 Pages.

Ex Parte Quayle Office Action for U.S. Appl. No. 29/661,030, filed Aug. 23, 2018 on behalf of KD Technologies, Inc., dated Aug. 14, 2019. 13 Pages.

Ex Parte Quayle Office Action for U.S. Appl. No. 29/661,031, filed Aug. 23, 2018 on behalf of KD Technologies, Inc., dated Aug. 14, 2019. 13 Pages.

Notice of Allowance for U.S. Appl. No. 29/661,028, filed Aug. 23, 2018 on behalf of KD Technologies, Inc., dated Oct. 22, 2019. 6 Pages.

Notice of Allowance for U.S. Appl. No. 29/661,030, filed Aug. 23, 2018 on behalf of KD Technologies, Inc., dated Oct. 23, 2019. 6 Pages.

Notice of Allowance for U.S. Appl. No. 29/661,031, filed Aug. 23, 2018 on behalf of KD Technologies, Inc., dated Oct. 22, 2019. 6 Pages.

Notice of Allowance for U.S. Appl. No. 29/661,026, filed Aug. 14, 2018 on behalf of KD Technologies, Inc., dated Oct. 23, 2019. 6 Pages.

\* cited by examiner

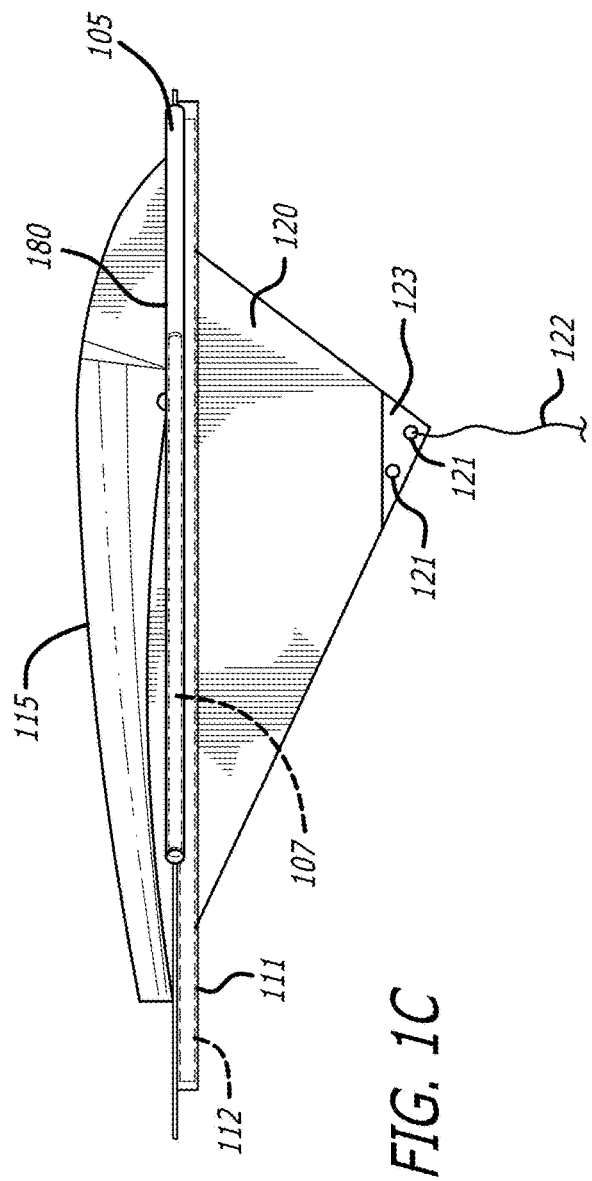
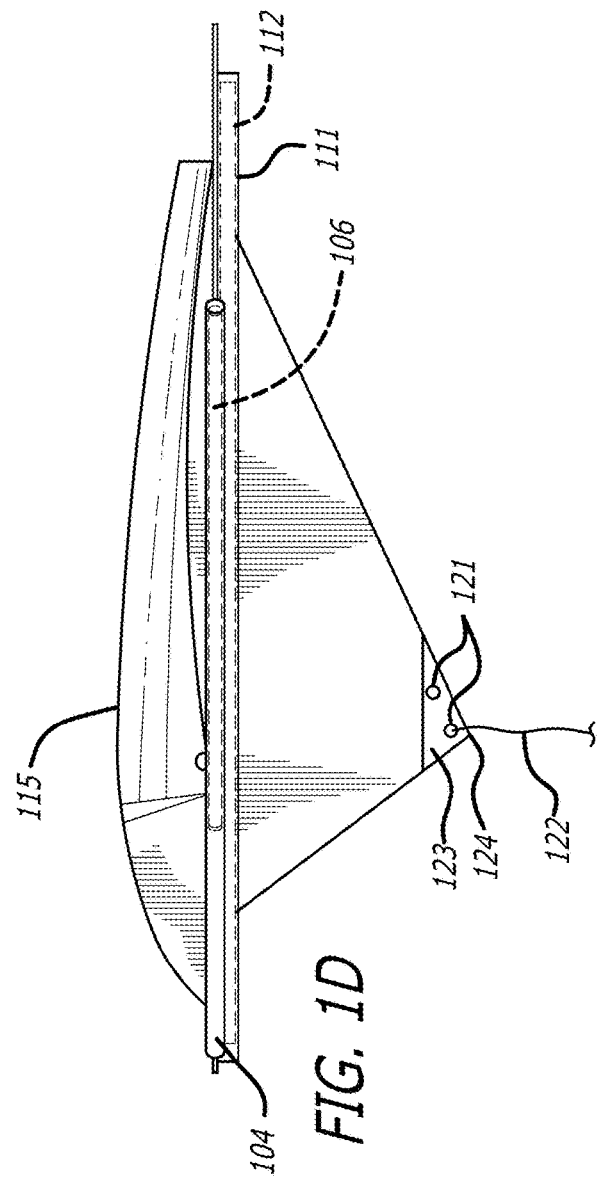
FIG. 1C
FIG. 1D

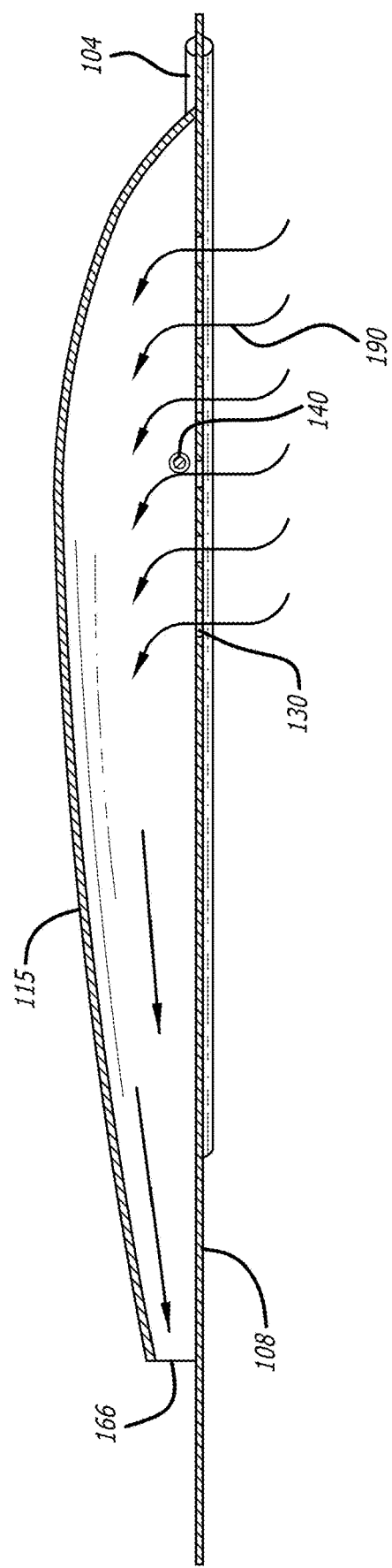

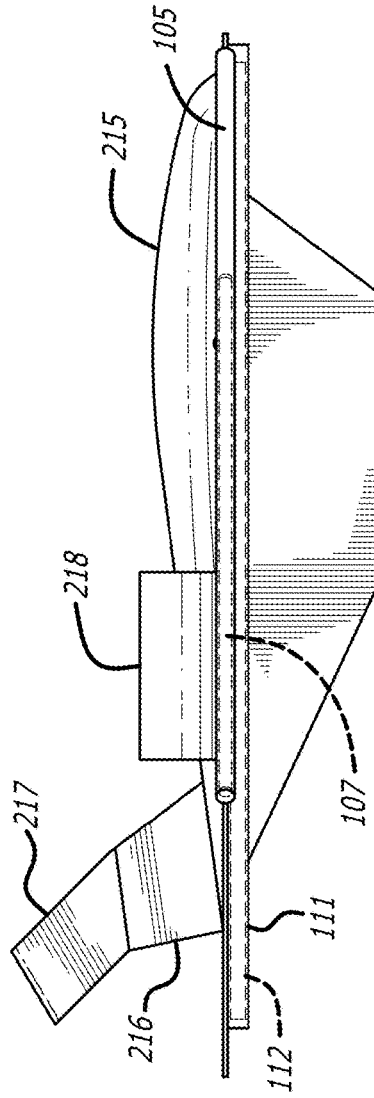
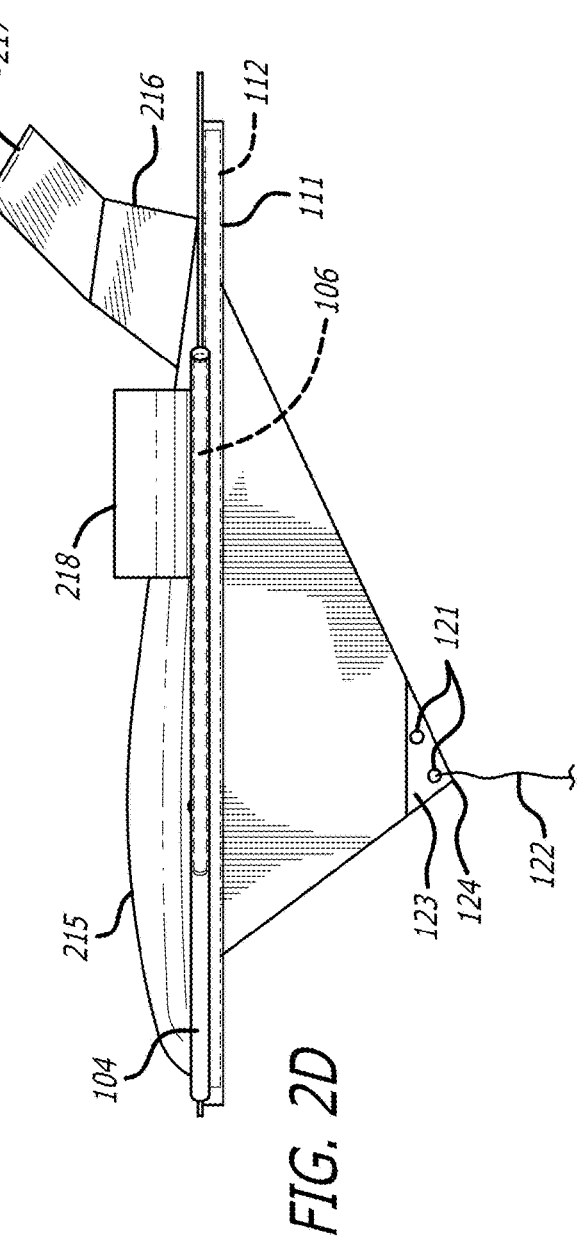
FIG. 2C
FIG. 2D

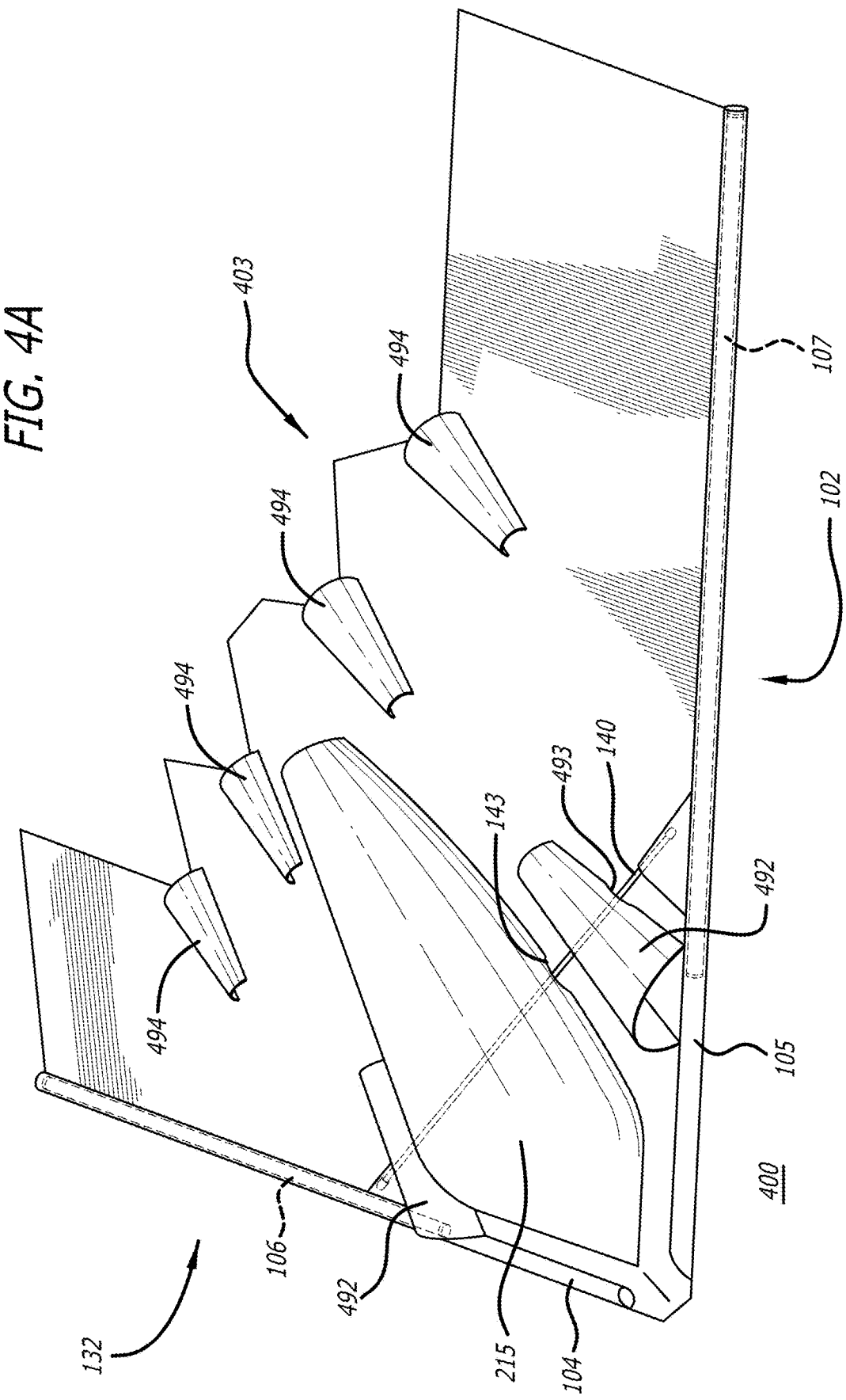

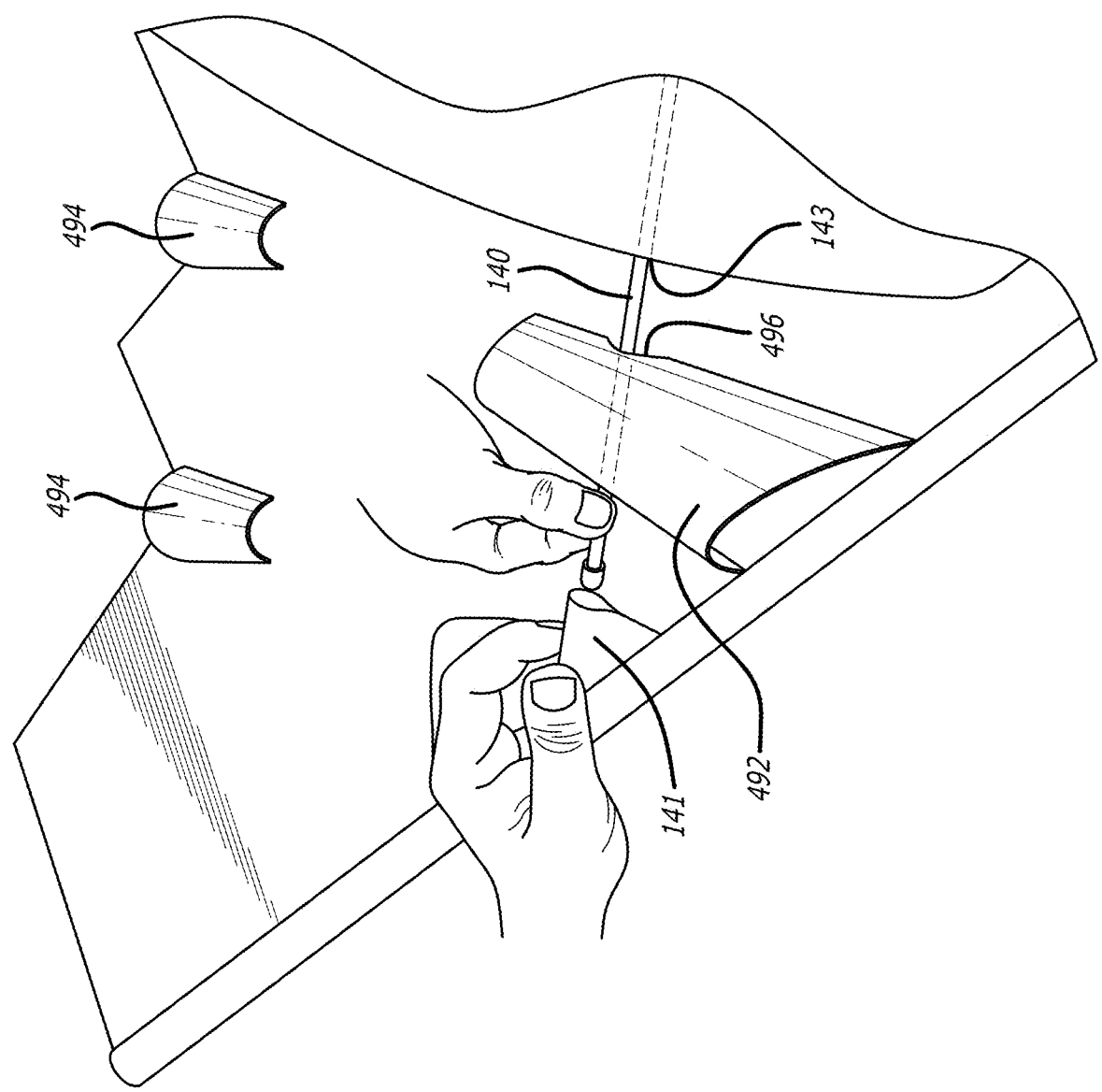

MODIFIED DELTA WING KITE WITH INFLATABLE FUSELAGE

CROSS-REFERENCE TO RELATED APPLICATIONS

The present application may be related to U.S. Design application Ser. No. 29/611,379 for a "Delta Wing Kite With Fin And Tubes" filed on Jul. 20, 2017 and U.S. Design application Ser. No. 29/611,385 for a "Delta Wing Kite" filed on Jul. 20, 2017, both of which are incorporated herein by reference in their entirety.

BACKGROUND

(1) Technical Field

The present disclosure is related to kites and more in particular to modified delta wing kites with inflatable fuselage.

(2) Background

A kite is traditionally thought of as a heavier-than-air craft with wing surfaces that work against the air to create lift and drag. The kite typically is flown from one or more flying lines, also known as tethering lines, to maintain the kite at the desired angle relative to the moving wind. The lift that sustains the kite in flight is generated when air moves around the kite's surface, producing low pressure above and high pressure below the wing. The interaction with the wind also generates horizontal drag along the direction of the wind. The results of the force vector from the lift and drag force components is opposed by the tension of one or more flying lines.

Kites have been proposed with inflatable components. One such device is a doughnut-shaped inflatable tube which might mount a central sheet formed with perforations. A device of this type is shown in U.S. Pat. No. 2,988,309 to Pohl.

Multi-cell kites have been proposed which include collapsible panels defining coextensive air passages and tethered by means of respective keels. A device of this type is shown in U.S. Pat. No. 374,008 to Grauel. Grauel has also proposed a flexible kite construction including a delta-shaped wing, mounting a keel thereunder to form a longitudinal passage open at its front and closed at its rear-end. A device of this type is shown in U.S. Pat. No. 3,951,36.

Other kite devices have been proposed which include constructions forming longitudinal passages open at their front extremities, an underlying keel and a tail element. A device of this type is showing U.S. Pat. No. 4,813,637 to Bondestam.

Other kite devices have been proposed which include an elongated sock-like wind tunnel, having delta wings on the opposite sides thereof. This type of device was showing in U.S. Pat. No. 4,830,313 to Chang.

A delta kite construction including a drag ring aft of the craft was described in U.S. Pat. No. 6,955,325, now expired.

There is a need for stability and performance improvement of delta wing kites while flying in various wind conditions. The disclosed device and methods address such need.

SUMMARY

According to a first aspect of the present disclosure, a delta wing kite is disclosed comprising: a planar, delta shaped sail having: a trailing edge; and leading edges extending rearwardly and outwardly of a leading edge apex; rigid or semi-rigid wing spars disposed along their respective leading edges; a rigid or semi-rigid central spar disposed centrally on the sail and extending longitudinally thereof; a flexible and inflatable, fuselage mounted on top of the sail, configured to inflate by receiving air flow through a plurality of through-holes formed on the bottom of the sail; and a keel mounted on the bottom of the sail, configured to be fastened to a flying line.

According to a second aspect of the present disclosure, a method of making a delta wing kite is disclosed comprising: fabricating a planar sail cut into a delta shape with a trailing edge and leading edges extending rearwardly and outwardly of a leading edge apex; forming through-holes centrally in the sail in a set pattern to compliment, at least partially, a peripheral outline; fabricating a fabric fuselage with side walls shaped with terminal edges configured to correspond to the peripheral outline; mounting the fabric fuselage on the delta wing kite thereby capturing the through-openings within confines of the fuselage; attaching a keel underneath the sail, the keel being connectable to a flying line; and attaching rigid or semi-rigid wing spars to the leading edges.

DESCRIPTION OF THE DRAWINGS

FIG. 1C shows a right-hand side view of the delta wing kite of FIG. 1A.

FIG. 1D shows a left-hand side view of the delta wing kite of FIG. 1A.

FIG. 1E shows a right-hand side view of a cross section of the delta wing kite of FIG. 1A demonstrating impact of air flow and its interaction with different elements of the delta wing kite.

FIG. 2C shows a right-hand side view of a cross section of the delta wing kite of FIG. 2A.

FIG. 2D shows a left-hand side view of a cross section of the delta wing kite of FIG. 2A.

FIG. 4A shows a top perspective view of a delta wing kite according to yet another embodiment of the present disclosure.

FIG. 4C shows an assembly step of a cross spar for the kite of FIG. 4A.

DETAILED DESCRIPTION

Figure 1A:
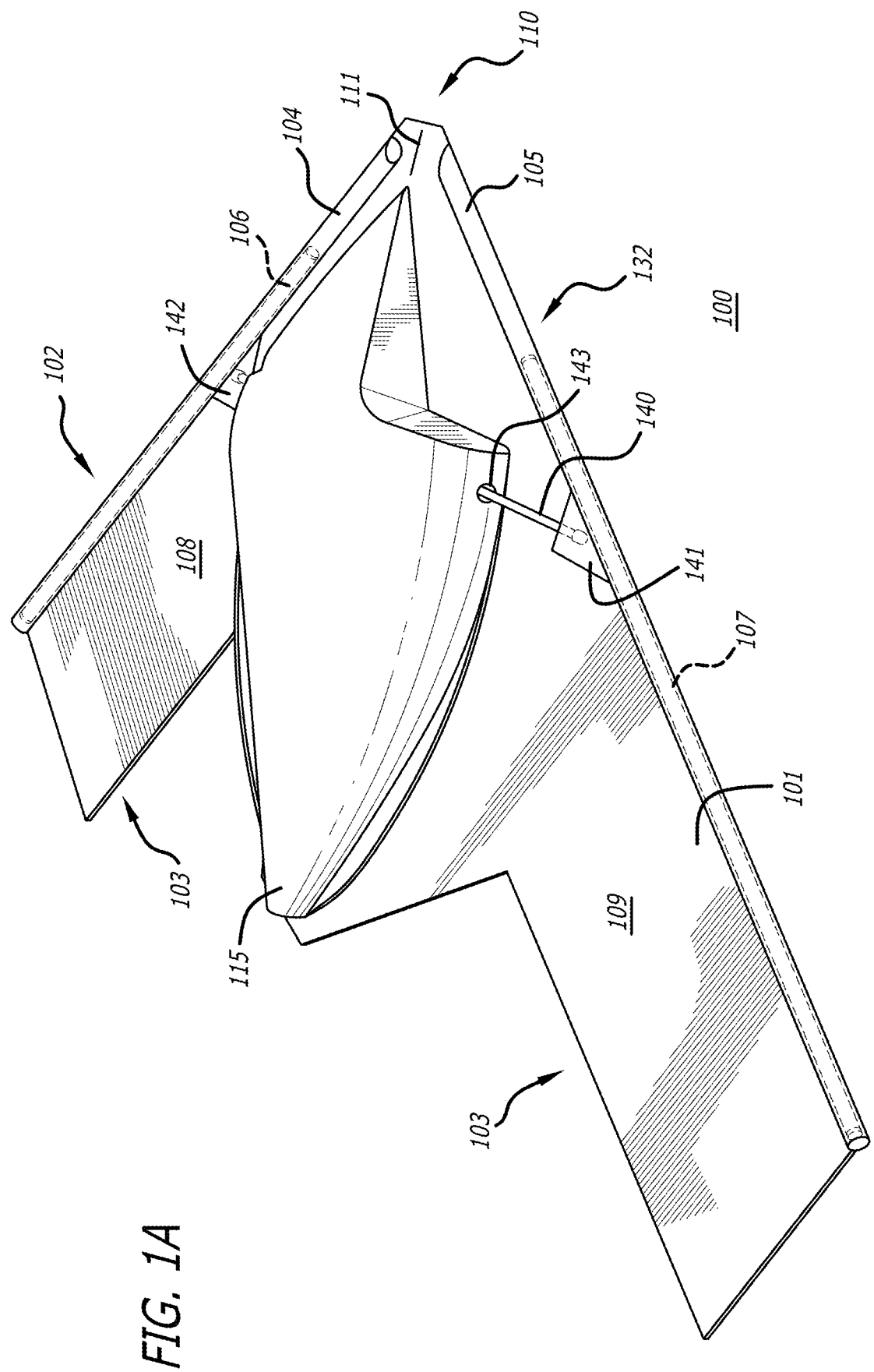
FIG. 1A shows a top perspective view of a delta wing kite according to an embodiment of the present disclosure.
Figure 1B:
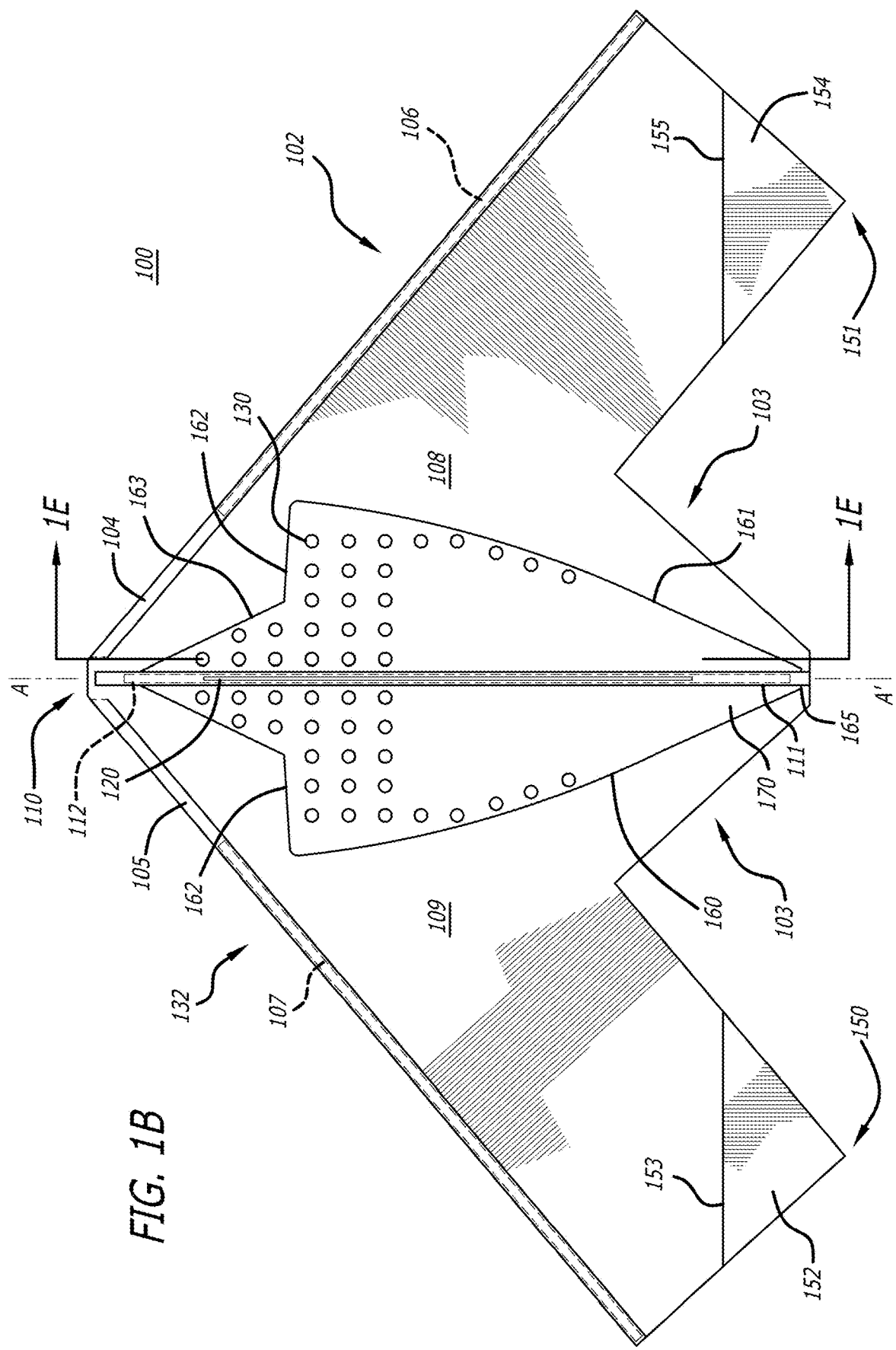
FIG. 1B shows a bottom plan view of the delta wing kite of FIG. 1A.

Referring to FIGS. 1A-1D, a delta wing kite (100) is shown in accordance with an embodiment of the present disclosure. The delta wing kite (100) comprises a planar, delta shaped sail (101) with a trailing edge (103) and leading edges (102, 132) extending rearwardly and outwardly of a leading edge apex (110). The sail (101) comprises leading edge sleeves (104, 105) placed along their corresponding leading edges (102, 132) and receiving respectively wing spars (106, 107). Also shown in FIG. 1B, is a central spar (112) disposed centrally on the sail (101) and extending longitudinally thereof. According to an embodiment of the disclosure, the central spar (112) may be housed in a central sleeve (111).

As shown in FIG. 1B, the sail (101) may have a vertical line of symmetry AA' dividing the sail (101) into two mirror image wings (108, 109). According to an embodiment of the present disclosure, the central sleeve (111) and the central spar (112) are aligned with the line of symmetry AA', extending from the leading edge apex (110) to the trailing edge (103).

Referring to FIG. 1A, the delta wing kite (100) further comprises an inflatable, upwardly projecting elongated fuselage (115). In operative conditions, the fuselage (115) provides lift, drag and stabilization for the delta wing kite (100). FIGS. 1C-1D show respectively right-hand and left-hand views of the kite (100). As shown in FIG. 1C, the delta wing kite (100) comprises a keel (120) having a keel reinforcement (123) and one or more keel attachment holes (121) where a flying line (122) can be fastened. According to an embodiment of the present disclosure, the keel (120) is sewn to the central sleeve (111) and has a triangular shape with a keel apex (124). The one or more keel attachment holes (121) may be placed at different distances from the keel apex (124) so that a combination of the fuselage (115) and the flying line (122) provide favorable balance of forces on the delta wing kite (100) for different angles of attack and during operation in various wind conditions. With further reference to FIG. 1B, the sail (110) is formed with a plurality of through-holes (130) underneath the fuselage (115), the plurality of through-holes (130) serving to inflate the fuselage (115) to the inflated configuration shown in FIG. 1A to thus create drag for balancing against anchoring forces applied through the flying line (122) and the keel (120). According to an embodiment of the present disclosure, and for a better stability, the keel (130) placement is such that the keel apex (124) is at a closer distance to the leading edge apex (110) than the delta wing kite (100) rear end.

Referring to FIG. 1A, the delta wing kite (100) comprises a cross spar (140) extending between the wing spars (106, 107) and protruding through a pair of complimentary fuselage holes (143) formed on opposite lateral walls of the fuselage (115). The cross spar (140) may extend substantially orthogonally to the central spar (112) in accordance with an embodiment of the present disclosure. With further reference to FIG. 1A, the delta wing kite (100) further comprises inwardly opening, top pockets (141, 142) that may be sewn into outboard edges of the wings (108, 109), medially along the length thereof, for receipt of opposite ends of the cross spar (140). According to some embodiments of the present disclosure, the cross spar (140) is resilient and of sufficient length such that during assembly it can be flexed in a slight bow for the opposite ends to be inserted in the respective top pockets (141, 142) and, upon release, cause the opposite ends to push outwardly on the wing spars (106, 107) to maintain the delta wing kite (100) distended laterally. A combination of the wings spars (106, 107), cross spar (140) and central spar (112) serves to support the sail (101) and to form a framework or skeleton for the delta wing kite (100). The top pockets (141, 142) may have triangular shape in accordance with an embodiment of the present disclosure.

With further reference to FIGS. 1A-1B, the person skilled in the art will appreciate that according to the teachings of the present disclosure, the through-holes (130) are provided in such a pattern to inflate the fuselage (115) having flexible walls carried on top of the sail (101) to thereby provide a distended surface for symmetrical flow of air on the opposite sides thereof, and to generate drag forces that may be balanced against the anchoring forces on the keel (120) suspended below the sail (101). The person skilled in the art will also understand that, without departing from the spirit and scope of the present invention, the delta wing kite (100) may take numerous different forms and configurations, so long as it possesses the characteristic of the delta wing construction with rearwardly and outwardly angled wings (108, 109). Embodiments in accordance with the present disclosure may be made wherein the trailing edge (103) has a zigzag shape with different numbers of corners and variable angles. Other embodiments may also be envisaged wherein the trailing edge has a curvilinear configuration. According to an embodiment of the present disclosure, the wing spars (106, 107) do not extend up to the leading edge apex (110). For assembly and replacement purposes, leading edge sleeves (104, 105) may be made with an opening at each of their respective ends closer to the leading edge apex (110) wherein the wing spars (106, 107) may be placed in or removed from their corresponding sleeve openings.

The person skilled in the art will appreciate that the spars may be designed based on the construction of the delta wing kite (100) and expected flying conditions. The wing spars (106, 107) and the central spar (112) may be designed to be sufficiently rigid so as not to bend under normal operating conditions or may be semi-rigid, having some flexibility but still supporting the delta wing kite (100) against collapse in windy conditions.

The person skilled in the art will also appreciate that, in operative condition and by virtue of incorporating a protuberance on top surface of the sail (102), the fuselage (115) provides drag as air flows rearwardly there over. Such drag combined with the lift provided by the wings (108, 109) and the anchoring forces generated by the flying line (122) and the keel (120) will result in balanced forces applied to the delta wing kite (100), thereby providing stability and minimized rolling and spinning during operative conditions.

According to an embodiment of the present disclosure, the sail (101) and the keel (120) are of lightweight planar, supple, and pliable fabric material, such as nylon, ripstop or other fabrics that do not tear easily resulting in a highly durable kite. Embodiments may be envisaged that are elaborately decorated with surface artwork and components to improve the appearance, and sometimes the performance. The fuselage (115) may be made of flexible, supple, and pliable, fabric material such as nylon, ripstop or the like. Such fabrics have the benefits of being impervious to the flow of air, light-weight and easily inflatable to thus not add excessively to the weight of the kite, thereby providing a proper vertical profile for the purpose of enhancing drag at the top of the delta wing kite (100).

The person skilled in art will understand that the fuselage (115) may take different form or shapes. For a better description of the fuselage (115) of FIG. 1A, reference is made to FIG. 1B-1C wherein seams in which lower terminal edges (190) of the fuselage (115) may be sewn are shown. The fuselage (115) is constructed with a medial body (170) being symmetric with respect to the line of symmetry AA', having two inwardly concave opposite side walls (160, 161) tapering rearwardly and inwardly to each other and towards a narrow tail section (165). Projecting forward of the medial body (170) and towards the leading apex (110), is a triangular nose section (163) forming a dynamic shape tending to flow air on opposite sides thereof and to maintain the delta wing kite (100) centered and flying in a straight line. Formed to transition between the nose section (163) and the medial body (170) are forwardly facing laterally extending, vertical shoulders (162). As shown in FIG. 1C, the lower terminal edges (180) of the fuselage (115) are stitched to the sail (101) by stitching in a pattern to capture the through-holes (130) of FIG. 1B within the confines of the fuselage (115).

With reference to FIG. 1B, the through-holes (130) follow a pattern to complement the shape of the nose section (163), shoulders (162) and side walls (160, 161) of the fuselage (115) of FIG. 1A. According to the teaching of the present disclosure, the through-holes (130) follow a pattern that are formed in a density and size for passage of a sufficient volume of air in normal operating conditions to provide for inflation of the fuselage (115) against the pressure of air flowing over the top of the kite, tending to maintain distension of the fuselage (115) walls.

Referring back to FIG. 1B, the kite (110) further comprises a pair of bottom pockets (152, 154) located at respective rear ends of their respective wings on corners (150, 151) that are furthest to the central sleeve (111). The bottom pockets (152, 154) are formed with forwardly facing openings (153, 155) to receive air flowing rearwardly to inflate and facilitate the stabilizing of the delta wing (100) in operative conditions.

FIG. 1E shows a right-hand side view of a cross section of the delta wing kite of FIG. 1A across an axis with longitudinal extension (axis shown with arrows 1E of FIG. 1B) demonstrating impact of air flow and its interaction with different elements of the delta wing kite. In operative conditions, the fuselage (115) will inflate via air flow and along arrows (190) and through the through-holes (130) resulting in stabilizing and directional force relative to such wind. According to an embodiment of the present disclosure, a rear end of the fuselage (115) may terminate in a small diameter restricted opening (166) having a cross-sectional flow area smaller than the combined flow area of the through-holes (130) so as to restrict exhaust flow to maintain the fuselage (115) pressurized to balloon the side walls out and maintain the top wall elevated. Other embodiments may also be made in accordance of the present disclosure wherein the rear end of the fuselage (115) is closed to further facilitate pressurization of the fuselage (115).

FIGS. 2A-2D show various views of a delta wing kite (200) according to another embodiment of the present disclosure. The principle of operation of the delta wing kite (200) is similar to that of the delta wing kite (100) of FIGS. 1A-1D. In what follows, the features of the delta wing kite (200) that are different from those described with regards to the delta wing kite (100) will be described.

Figure 2A:
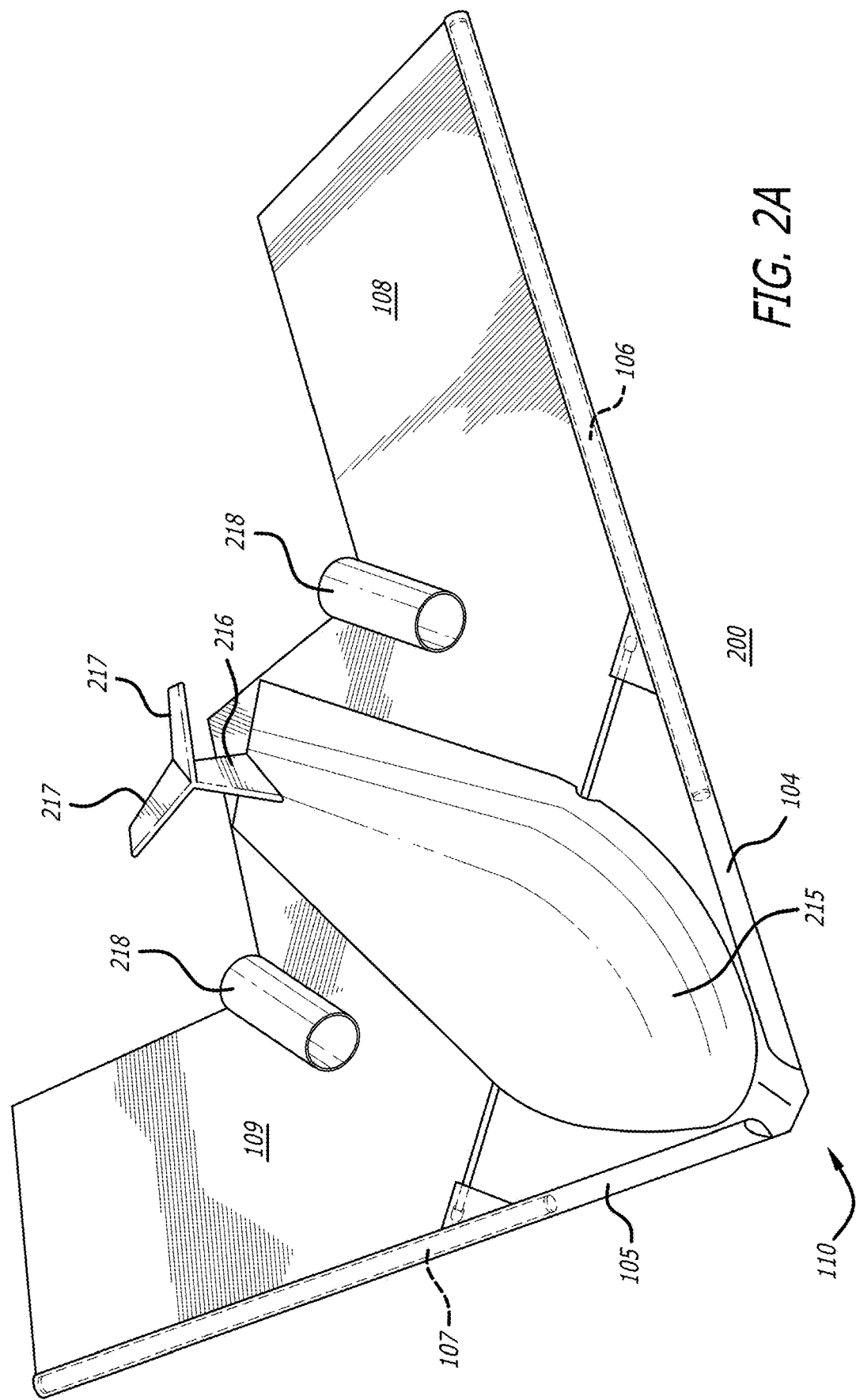
FIG. 2A shows a top perspective view of a delta wing kite according to another embodiment of the present disclosure.
Figure 2B:
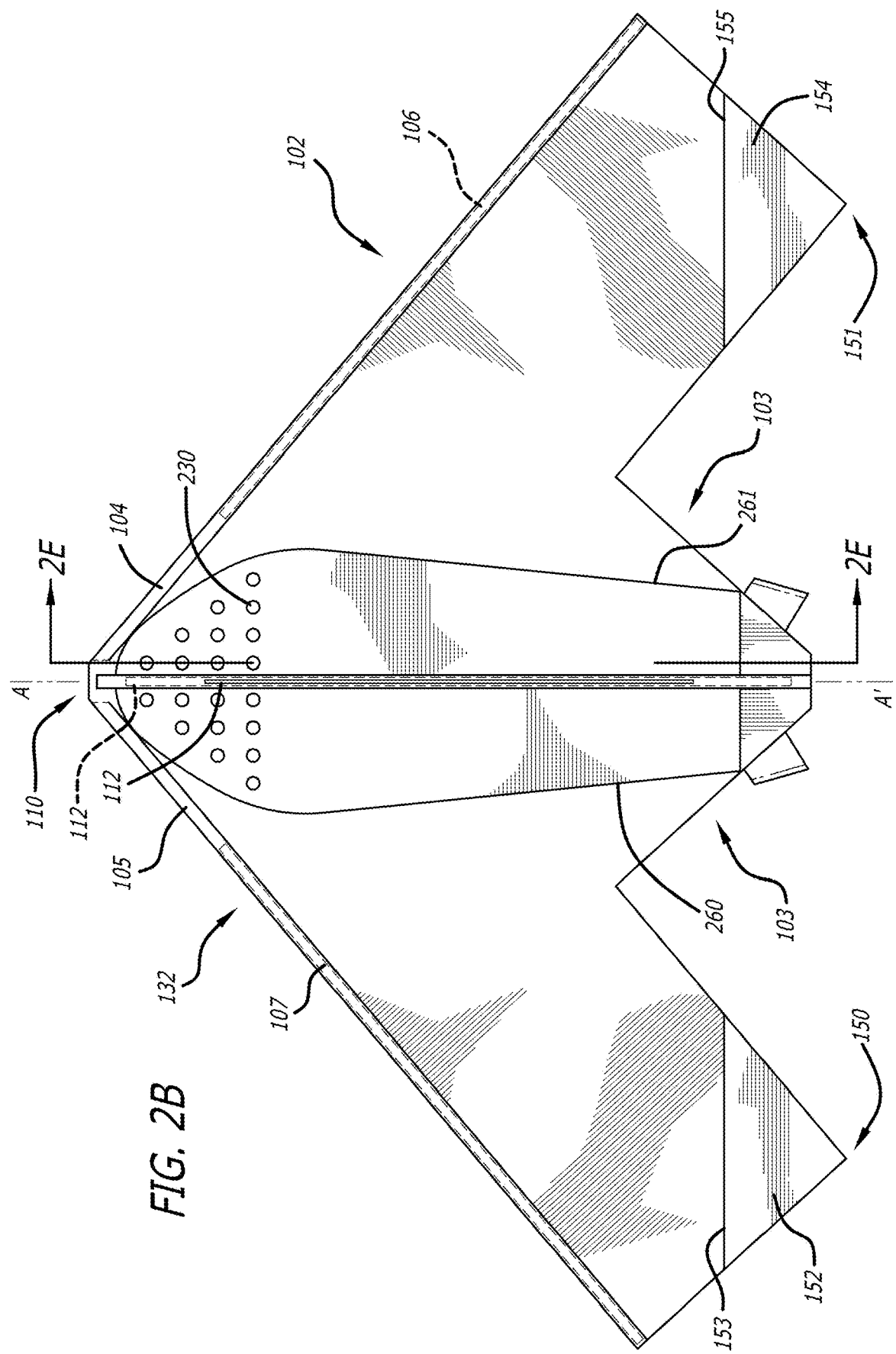
FIG. 2B shows a bottom plan view of the delta wing kite of FIG. 2A.

The delta wing kite (200) of FIG. 2A comprises a fuselage (215) with side walls that expand laterally outwardly and converging to each other in a forward direction towards the leading edge apex (110). The fuselage (215) mounts at its rear extremity a flexible, hollow, fabric, vertical tail (216) which is bifurcated at an upper end to form laterally projecting V-shaped stabilizers (217). In operative conditions, the vertical tail (216) and the stabilizers (217) are inflated with inflation of the fuselage (215).

Figure 2E:
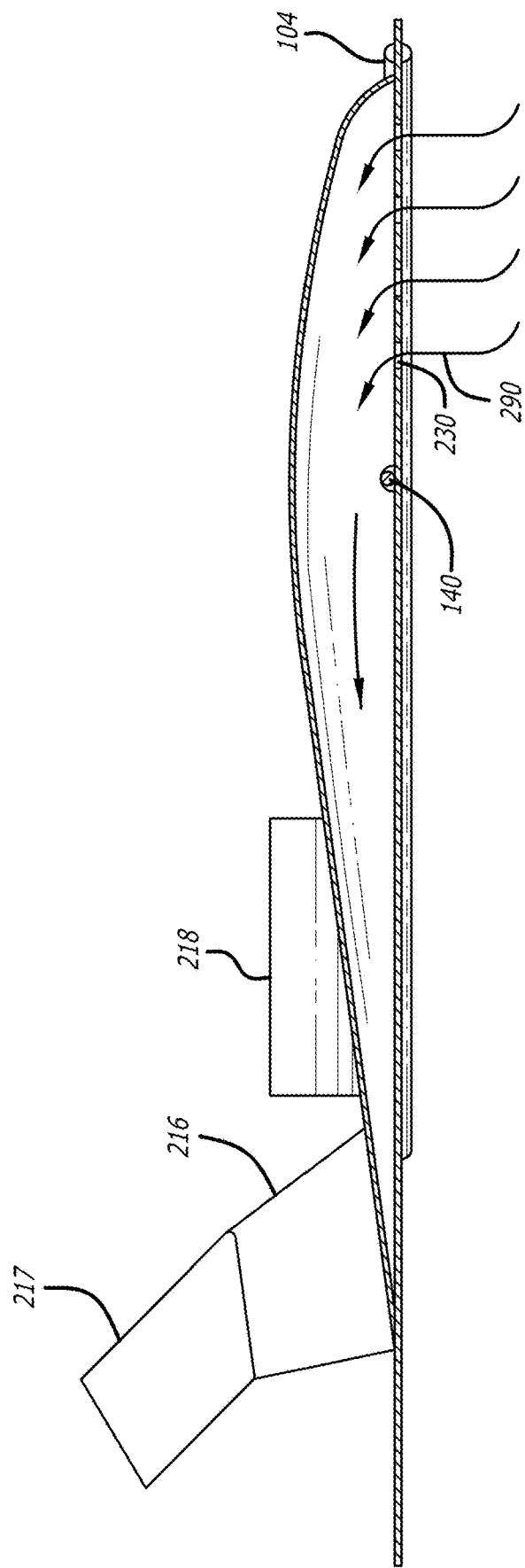
FIG. 2E shows a right-hand side view of a cross section of the kite of FIG. 2A, demonstrating impact of air flow and its interaction with different elements of the delta wing kite.

The delta wings kite (200) further comprises one or more pairs of pods (218) (one pair shown in FIG. 2A). The pods of each of the one or more pair of pods (218) are placed, symmetrically with respect to the central spar (112) on their corresponding wings (108, 109). According to an embodiment of the present disclosure, the one or more pairs of pods (218) are made of fabric and have a tubular shape. In operative conditions, the one or more pairs of pods (218) receive air streams passing rearwardly there through to inflate and enhance stabilization and overall performance of the delta wing kite (200). FIG. 2E shows a right-hand side view of a cross section of the delta wing kite of FIG. 2A, across an axis with longitudinal extension (axis shown with arrows 2E of FIG. 2B), demonstrating impact of air flow and its interaction with different elements of the delta wing kite (200). In operative conditions and as result of the delta wing kite (200) facing into wind, the fuselage (215), the vertical tail (216) and the stabilizers (217) will inflate via air flow and along arrows (290) of FIG. 2E to thus provide a stabilizing and directional force relative to such wind. Concurrently, the air stream flowing through the one or more pairs of pods (218) experience lower pressure due to Venturi effect, thereby generating balancing forces that will help improve the performance of the delta wing kite (200).

Figure 3A:
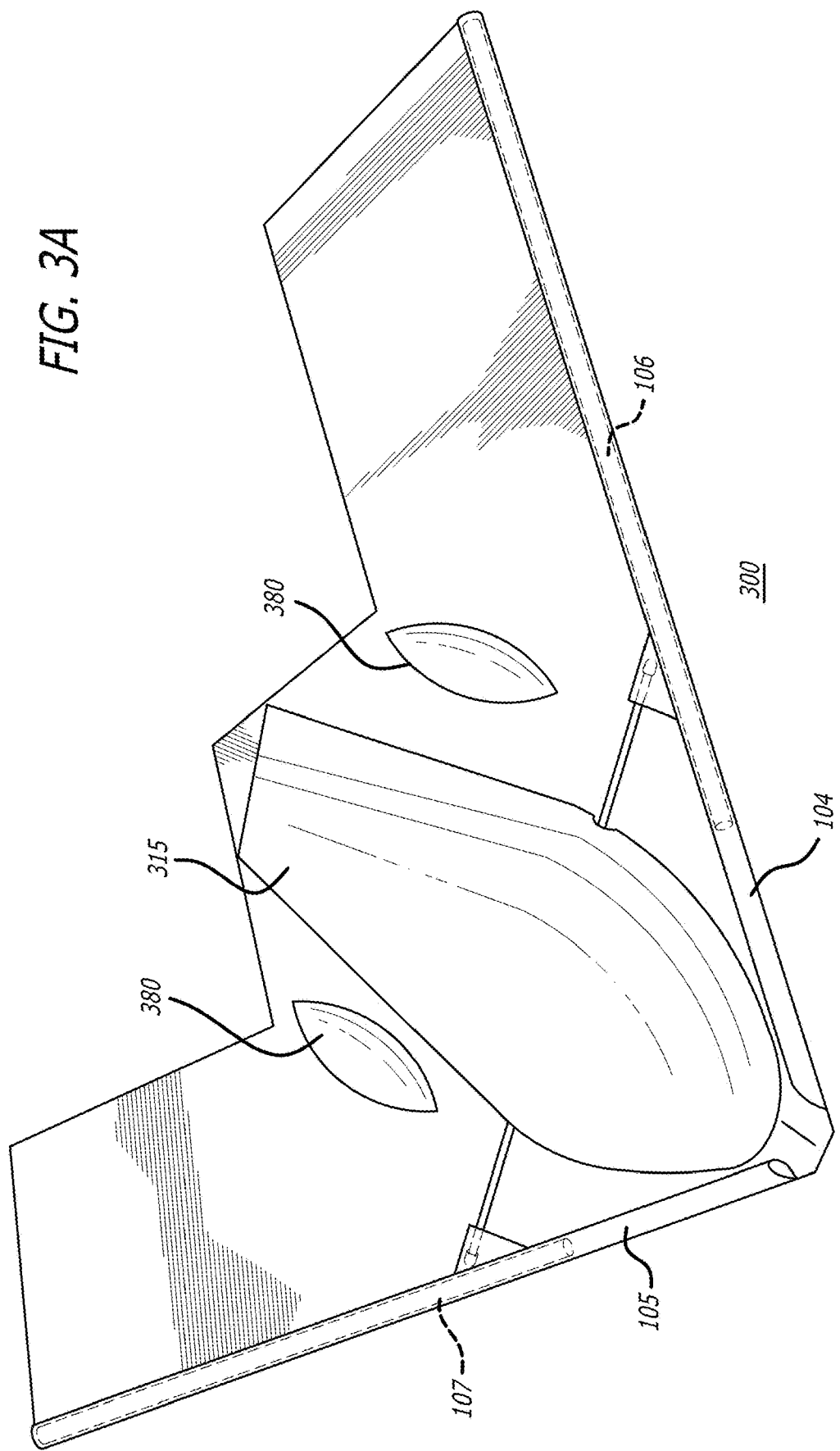
FIG. 3A shows a top perspective view of a delta wing kite according to a further embodiment of the present disclosure
Figure 3B:
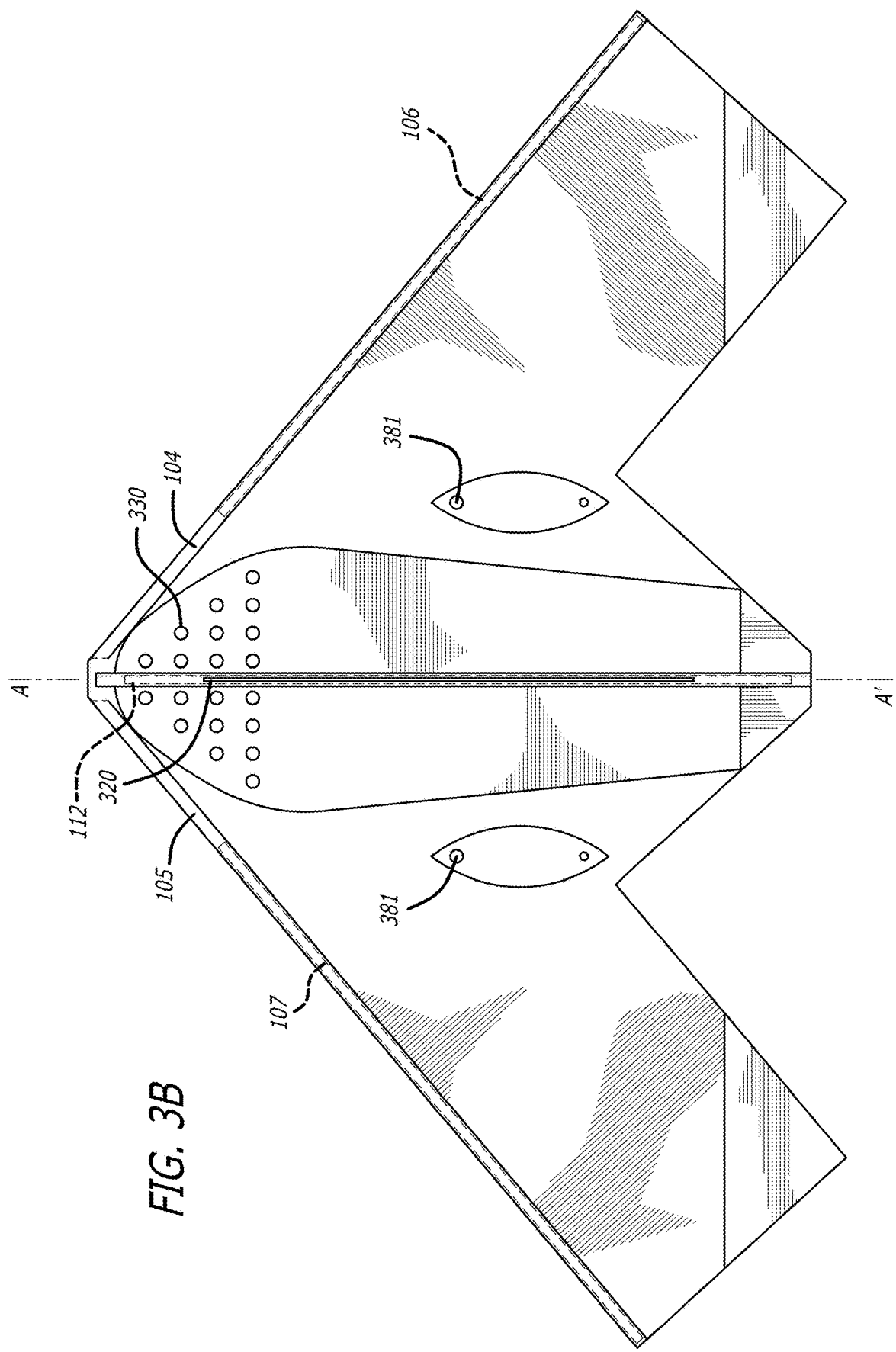
FIG. 3B shows a bottom plan view of the delta wing kite of FIG. 3A.

FIG. 3A-3B respectively show top and bottom view of a delta wing kite (300) in accordance with a further embodiment of the present disclosure. The principle of operation of the delta wing kite (300) is similar to what was described with regards to the delta wing kite (100) of FIG. 1A. In what follows, features of the delta wing kite (300) that are different from those of the previously presented embodiments will be described.

The delta wing kite (300) comprises a pair of elongated inflatable elliptically shaped fabric pods (380) flanking the fuselage (315). In accordance with an embodiment of the present disclosure, the pods (380) may be disposed laterally and spaced outwardly about one fourth of the total width of the wingspan. With reference to FIGS. 3A-3B, other embodiments may be envisaged where the pods (380) are placed symmetrically with respect to the central spar (312). With reference to FIG. 3B, pairs of longitudinally spaced apart inflation holes (381) are formed in the fabric of the respective wings underneath corresponding pods (380). During flight, the high pressure on the bottom surface of the delta wing kite (300) will serve to flow air through inflation holes (381) to inflate the respective pods (380) to distend the walls thereof and provide for air to flow rearwardly thereon and around to provide stabilizing forces.

Figure 4B:
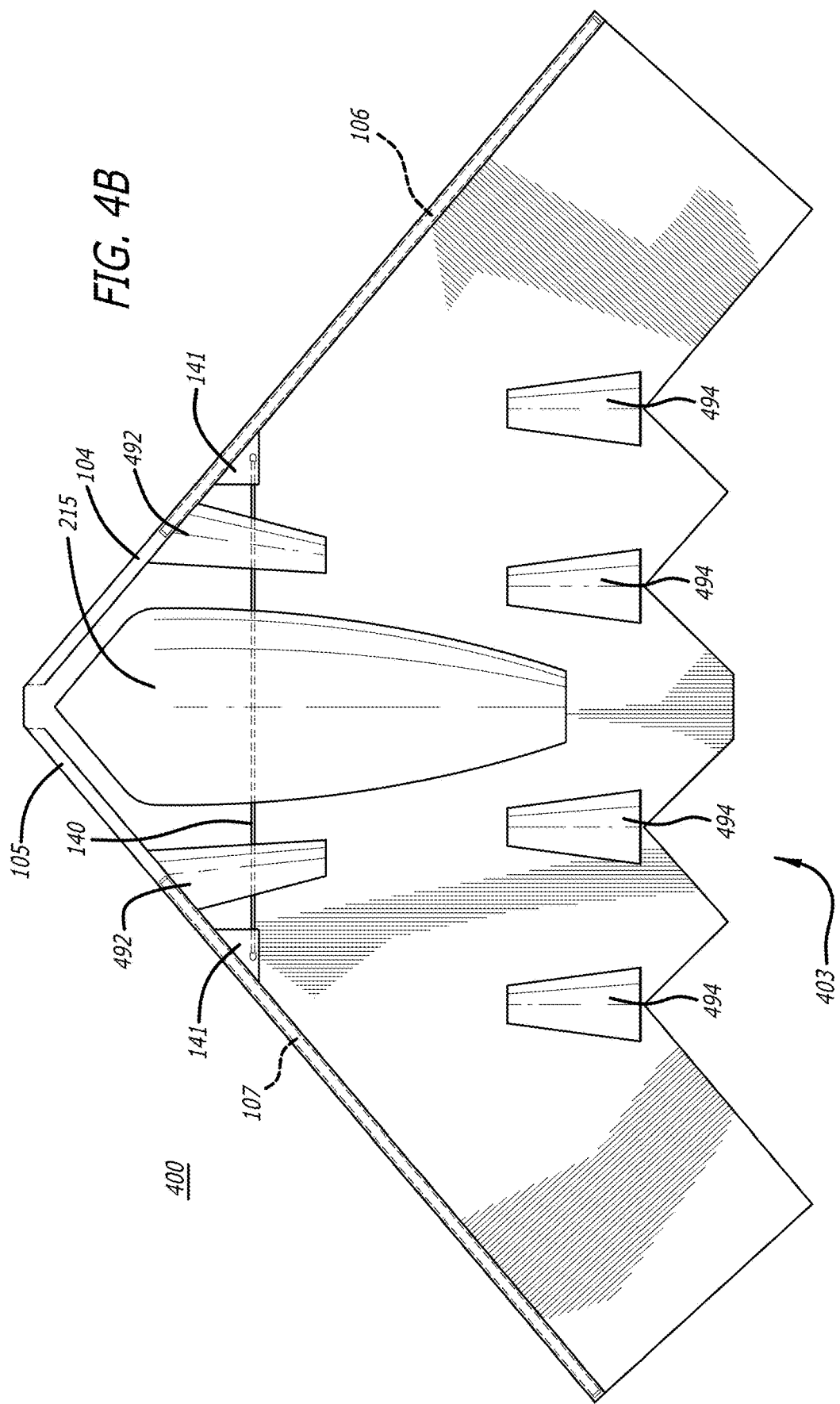
FIG. 4B shows a top plan view of the delta wing kite of FIG. 4A.

FIGS. 4A-4B shows respectively top and bottom view of a delta wing kite (400) in accordance with a further embodiment of the present disclosure. The principle of operation of the delta wing kite (200) is similar to what was described with regards to the delta wing kite (200) of FIG. 2A. In what follows, features of the delta wing kite (400) that are different from the features of the previously presented embodiments will be described.

The delta wing kite (400) comprises a plurality of back pods (494) and a pair of front pods (492). Similar to the pods (218) of FIG. 2A, the back pods (494) are spaced laterally and disposed on the sail and close to a trailing edge (403). The trailing edge (403) has a zigzag shape with more number of corners and angles compared to trailing edges of the described previous exemplary embodiments of FIG. 2A and FIG. 3A. The pair of front pods (492) are placed closer to leading edges (102, 132) flanking the fuselage (215) and being spaced laterally. The plurality of back pods (494) and the pair of front pods (492) are tubular in shape with openings of different sizes at each end. Embodiments according to the present disclosure may also be made wherein the plurality of back pods (494) and the pair of front pods (492) are tubular in shape with openings of the same size at each end. A combination of the back pods (494) and front pods (492) is served to improve performance and stability of the delta wing kite (400) according to the same mechanism as the one described previously and with regards to the delta wing kite (200) of FIG. 2A.

Figure 1F:
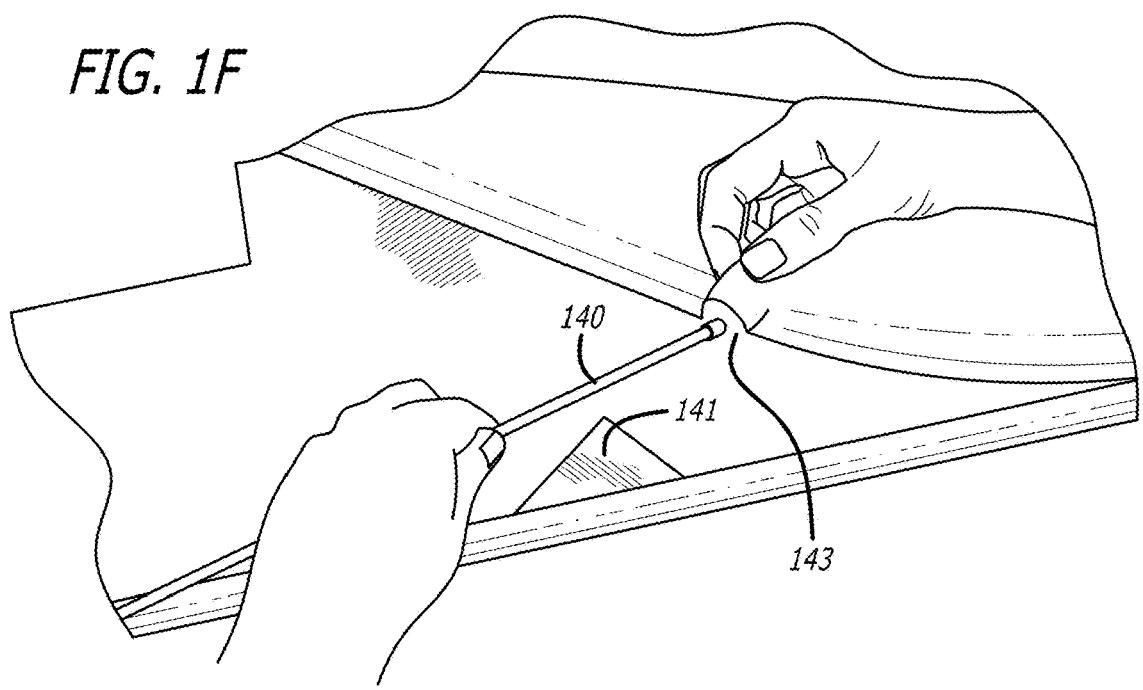
FIGS. 1F-1G show assembly of the cross spar for the delta wing kite of FIG. 1A.
Figure 1G:
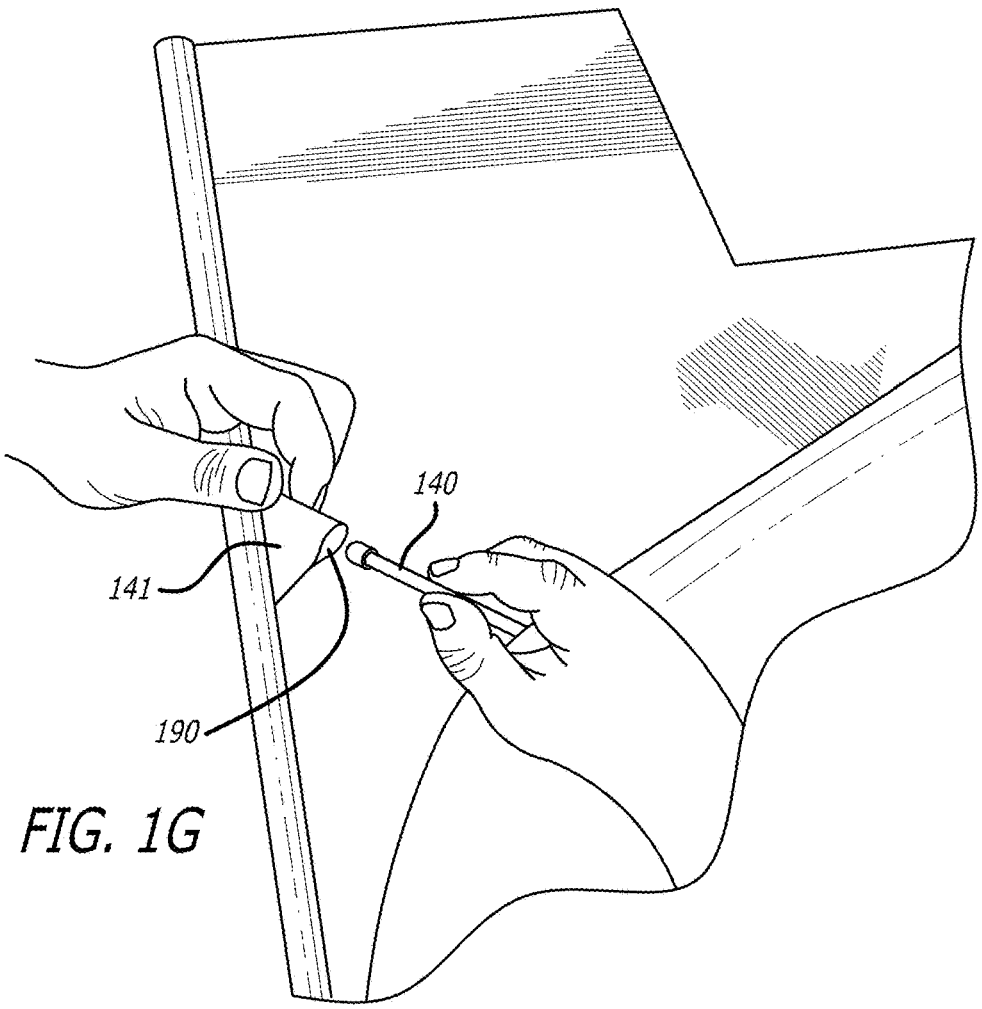
Figure 1H:
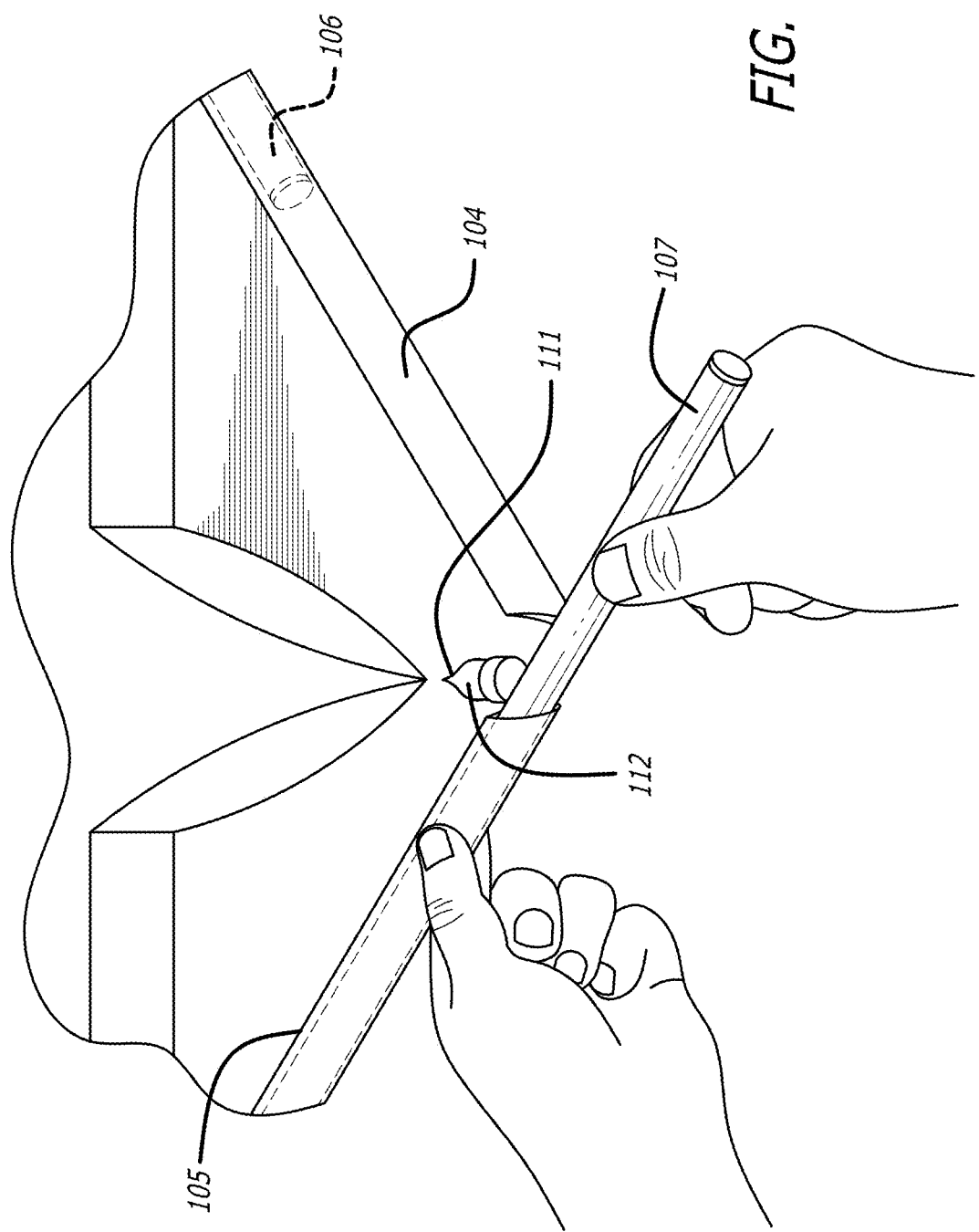
FIG. 1H shows how the spar are inserted inside their corresponding sleeves.

Referring back to FIG. 1A, in order to make the delta wing kite (100) in accordance with the teachings of the present disclosure, the pattern of the sail (101) may be laid down and cut to shape to provide the outline for the respective wings (108, 109), and trailing edge (103). The through-holes (130) may be die-cut and then formed centrally in the sail (101) in the desired pattern to compliment, at least partially, the shape of the particular fuselage (115). The leading edge sleeves (104, 105) may then be sewn into their corresponding leading edges (102, 132) of the sail (101). Some further steps of making the kite (100) may be to place the central spar (112) inside the central sleeve (111), to sew the central sleeve (111) to the keel (120) and then to sew the central sleeve (111) down the center of the sail (101) along the symmetry line AA' so that the central sleeve (111) has its both opposite ends closed. Inwardly opening, top pockets (141, 142) may be sewn into edges of the sail (101), medially along their corresponding leading edges (102, 132), for receipt of the cross spar (140). The bottom pockets (152. 154) may then be sewn to their respective wings on the corners (150, 151) that are furthest to the central sleeve (111). The fuselage (115) may be stitched at its peripheral edges to the sail (101) to provide for an essentially sealed seam to prevent excess escape of air. The cross spar (112) may be installed before flight and by the user and removed for packaging and storage of the kite. To be installed, with reference to FIG. 1A and FIGS. 1F-1G, one end of the cross spar (112) is housed inside a corresponding top pocket (141) or (142) via corresponding top pocket holes (190), the cross spar (112) is then projected laterally through the fuselage holes (143). The cross spar (112) is then flexed into a slight bow so that its opposite end may be received by the respective top pocket (142) or (141). Upon release, the cross spar opposite ends will push outwardly on the wing spars (106, 107) resulting in a lateral expansion of the delta wing kite (100). FIG. 1H shows how the wing spars (106, 107) are inserted in their corresponding sleeves (104, 105). The central spar (112) when inserted in the central sleeve (111) is also shown in FIG. 1H. According to an embodiment of the present disclosure, the wing spars (106, 107) and the central spar (112) have all the same length and diameter. According to further embodiments of the disclosure, the wing spars (106, 107) and the central spar (112) are all 28.5 inches long. Further embodiment in accordance with the present disclosure may be made wherein when fully inserted inside their corresponding sleeves (104, 105), the wing spars (106, 107) are spaced approximately 9 inches from the apex (110) and each of the leading edges (102) measure approximately 37.5 inches in length. Some embodiments according to the present disclosure may have plugs at each end to protect fabric from fraying.

FIG. 4C demonstrates the assembly of a cross spar (440) of delta wing kite (400) which is slightly different from the same assembly as described with regards to the delta wing kite (100). According to an embodiment of the present disclosure, a pair of complimentary front pod holes (496) is formed on laterally opposite sides of each front pod of the pair of front pods (492). The front pod holes (496) are formed such that they are laterally colinear with fuselage holes (143). As such, the cross spar (140) is first projected through the front pod holes (496) and the fuselage holes (143) before opposite ends of the cross spar (140) is received by the top pockets (141) in a manner similar to what was described above with regards to the delta wing kite (100).

The invention may be embodied in other forms without departure from the spirit and essential characteristics thereof. The embodiments described therefore are to be considered in all respects as illustrative and not restrictive. Although the present invention has been described in terms of certain preferred embodiments, other embodiments that are apparent to those of ordinary skill in the art are also within the scope of the invention. Accordingly, the scope of the invention is intended to be defined only by reference to the appended claims.

What is claimed is:

1. A delta wing kite comprising:
   a planar, delta shaped sail having:
      a trailing edge; and
      leading edges extending rearwardly and outwardly of a leading edge apex;
   rigid or semi-rigid wing spars disposed along their respective leading edges;
   a rigid or semi-rigid central spar disposed centrally on the sail and extending longitudinally thereof;
   a flexible and inflatable, fuselage mounted on top of the sail, configured to inflate by receiving air flow through a plurality of through-holes formed on the bottom of the sail; and
   a keel mounted on the bottom of the sail, configured to be fastened to a flying line.

2. The delta wing kite of claim 1, further comprising a cross spar extending laterally between the wing spars and pushing on the wing spars, thereby spreading the wing spars apart to maintain the delta wing kite distended laterally.

3. The delta wing kite of claim 2, wherein a pair of complimentary fuselage holes are formed on opposite lateral walls of the fuselage.

4. The delta wing kite of claim 3, further comprising a pair of top pockets attached to edges of the wings along the leading edges.

5. The delta wing kite of claim 4, wherein the cross spar is projected through the complimentary fuselage holes and opposite end of the cross spar are received by the pair of top pockets.

6. The delta wing kite of claim 1, wherein the fuselage comprises:
   a medial body having two inwardly concave opposite side walls tapering rearwardly and inwardly to each other and towards a narrow tail section close to the trailing edge;
   a nose section projected forward of the medial body and towards the leading edge apex; and
   forwardly facing and laterally extending vertical shoulders to transition between the nose section and the side walls;
   wherein the side walls are terminated in lower terminal edges which are attached to the sail in a pattern to capture the plurality of through-holes within the fuselage confines.

7. The delta wing kite of claim 6, wherein a rear end of the fuselage is closed thereby facilitating pressurization in operative conditions.

8. The delta wing kite of claim 6, wherein a rear end of the fuselage is terminated in a small diameter opening having a cross-sectional area smaller than a combined flow area of the through-holes, thereby, in operative conditions, restricting exhaust flow to maintain the fuselage pressurized to balloon the side walls out and maintain a top wall of the fuselage elevated.

9. The delta wing kite of claim 1, formed symmetrically with respect to a line of symmetry extending centrally from the leading edge apex to the trailing edge and dividing the sail into mirror image wings.

10. The delta wing kite of claim 9, further comprising a pair of bottom pockets located at respective rear ends of their respective wings on corners that are furthest to the central spar, wherein the bottom pockets are formed with forwardly facing opening to receive air flowing rearwardly to inflate, thereby facilitating stabilizing of the delta wing kite in operative conditions.

11. The delta wing kite of claim 1, wherein the trailing edge has a zigzag shape with different number of corners and variable angles.

12. The delta wing kite of claim 1, wherein the trailing edge has a curvilinear configuration.

13. The delta wing kite of claim 1, wherein:
the wing spars are housed inside corresponding leading edge sleeves placed along their corresponding leading edges; and
the central spar is housed inside a central sleeve.

14. The delta wing kite of claim 13, wherein the leading edge sleeves are made with an opening at each of their respective ends closer to the leading edge apex and wherein the wing spars can be placed in or removed from their corresponding sleeve openings.

15. The delta wing kite of claim 1, wherein the fuselage comprises side walls configured, in operative conditions, to expand laterally outwardly and converging to each other in a forward direction towards the leading edge apex.

16. The delta wing kite of claim 15, wherein the fuselage further comprises a flexible, hollow, fabric vertical tail mounted at a rear extremity of the fuselage, the vertical tail being bifurcated at an upper end to form laterally projecting V-shaped stabilizers, wherein in operative conditions, the tail and the stabilizers are inflated with inflation of the fuselage.

17. The delta wing kite of claim 16, further comprising one or more pair of pods, wherein the pods of each of the one or more pair of pods are placed on the sail and symmetrically with respect to the central spar and wherein the one or more pair of pods are made of fabric and have a tubular shape.

18. The delta wing kite of claim 17, further comprising a pair of elongated inflatable elliptically shaped fabric pods flanking the fuselage, wherein the pods of the pair of pods are placed on the sail and symmetrically with respect to the central spar.

19. The delta wing kite of claim 18, further comprising pairs of longitudinally spaced apart inflation holes formed on the sail underneath corresponding elliptically shaped fabric pods.

20. The delta wing kite of claim 15, further comprising:
a plurality of back pods spaced laterally and disposed on the sail and close to the trailing edge;
a pair of front pods placed closer to the leading edges, flanking the fuselage, and being spaced laterally, and wherein the plurality of the back pods and the pair of front pods are made of fabric and are tubular in shape.

21. The delta wing kite of claim 20, wherein:
a pair of complimentary fuselage holes are formed on opposite lateral walls of the fuselage;
a pair of complimentary front pod holes is formed on laterally opposite sides of each front pod of the pair of front pods; and
the front pod holes are formed laterally collinear with the fuselage holes, thereby allowing, during assembly, a cross spar being projected through the front pod holes and the fuselage holes.

22. The delta wing kite of claim 21, further comprising a pair of top pockets formed along respective leading edges and receiving opposite ends of the wing spar during assembly.

23. The delta wing kite of claim 1, wherein the keel has one or more keel attachment holes where the flying line can be fastened.

24. The delta wing kite of claim 1, wherein the keel, the sail and the fuselage are made of fabric.

25. The delta wing kite of claim 1, wherein the through-holes are formed in a set pattern to compliment, at least partially, a shape of the fuselage.

26. The delta wing kite of claim 1, wherein a rear end of the fuselage is terminated in an opening.

27. The delta wing kite of claim 26, wherein the opening having a cross-sectional flow area smaller than a combined area of the through-holes thereby restricting exhaust flow to maintain the fuselage inflated in operative conditions.

28. The delta wing kite of claim 1, wherein a rear end of the fuselage is closed to facilitate pressurization in operative conditions.

29. The delta wing kite of claim 1, wherein the wing spars and the central spar have all same length and diameter.

* * * * *